J. A. MANNS.
ELECTRIC ENGINE.
APPLICATION FILED OCT. 12, 1920.
1,377,087.
Patented May 3, 1921.
2 SHEETS—SHEET 1.
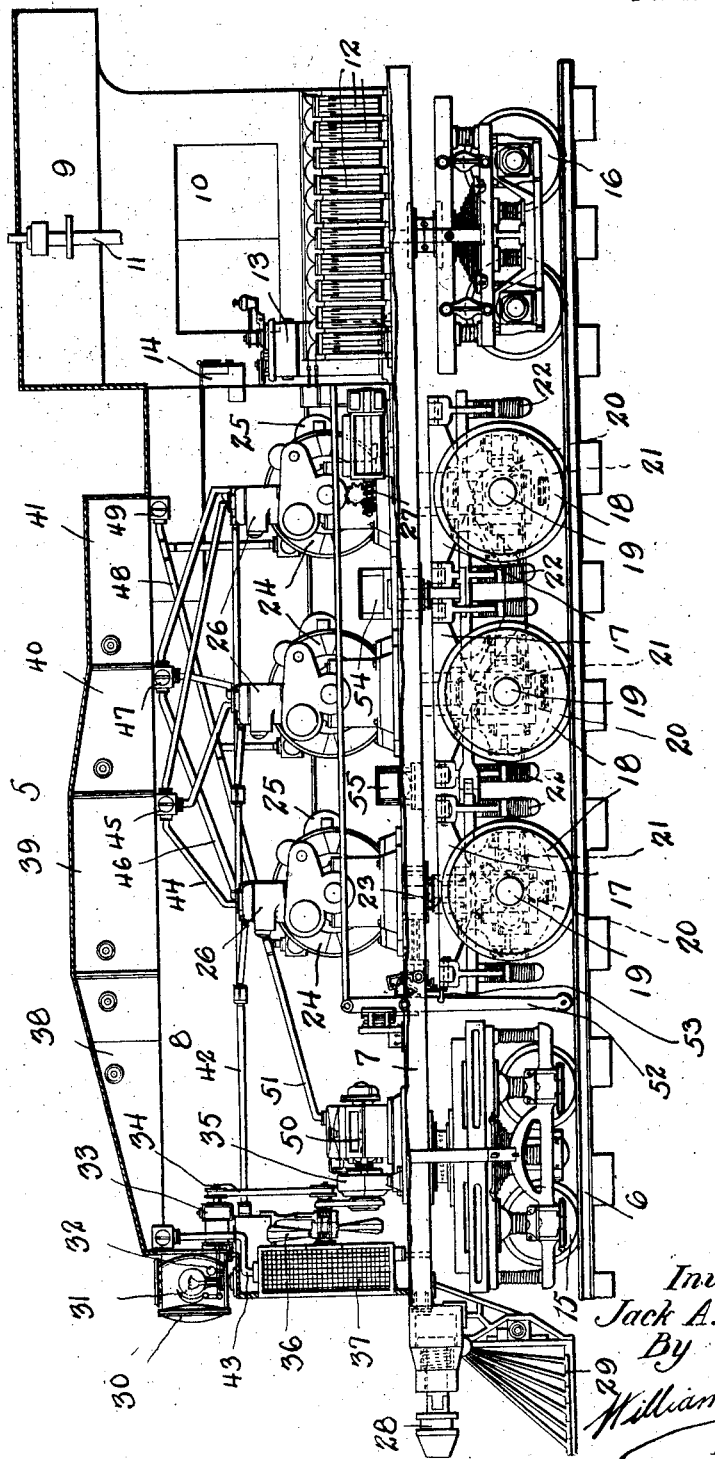
Inventor -
Jack A. Manns
By
William C. Sinton
Attorney

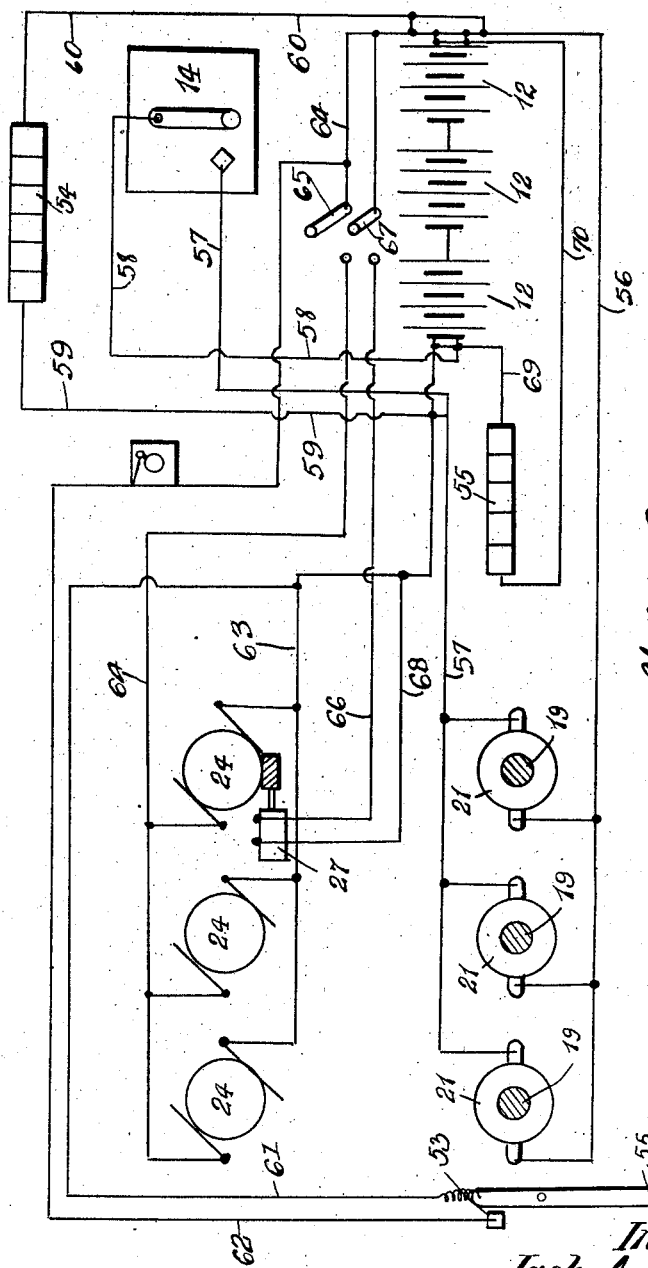

UNITED STATES PATENT OFFICE.

JACK A. MANNS, OF TORONTO, ONTARIO, CANADA.

ELECTRIC ENGINE.

1,377,087. Specification of Letters Patent. Patented May 3, 1921.

Application filed October 12, 1920. Serial No. 416,527.

*To all whom it may concern:*

Be it known that I, JACK A. MANNS, a citizen of the United States, residing at Toronto, in the Province of Ontario, Canada, have invented certain new and useful Improvements in Electric Engines; and I do hereby declare that the following is a full, clear, and exact description of the invention, such as will enable others skilled in the art to which it appertains to make and use the same.

The present invention relates to new and useful improvements in electric locomotives.

The primary object of the invention is the provision of a locomotive in which suitable motors are provided for the same as a driving means.

Another object of the invention is the provision of a locomotive having novel means for driving the same including electric motors and means for supplying current thereto for operating purposes.

Still another object of the invention is the provision of a locomotive upon which suitable motors are mounted upon the axles of the driving wheels for the purposes of driving the same, and in which generators are employed for charging batteries from which current to the electric motors is supplied.

A further object of the invention is the provision of a locomotive such as above referred to which includes a frame mounted upon the usual drive wheels which may be of any preferred number and which are actuated by electric motors placed directly on the axles thereof, together with a series of high voltage storage batteries which are designed to supply current to the motors and also generators for charging the storage batteries and gas or oil engines for driving the generators, together with means for automatically breaking the circuit and stopping the motors, for supplying fuel and lubricant to the engines which drive the generators, a proper cooling system for the engines and generators, and also illuminating means for the said locomotive.

A still further object of the invention is the provision of an electric locomotive such as above referred to, and which will be comparatively simple and inexpensive to manufacture, reliable and efficient in use and readily operated.

With the above and other objects in view, the present invention resides in the novel features of construction, formations, combinations and arrangements of parts which will be hereinafter more fully described, claimed, and illustrated in the accompanying drawings forming a part of the present application, and in which:

Figure 1 is a longitudinal sectional view taken through an electric locomotive constructed in accordance with the present invention, and, Fig. 2 is a diagrammatical view showing the wiring of the several parts.

Referring now to the accompanying drawings by similar characters of reference throughout the several views, the numeral 5 designates in general my improved locomotive which is mounted, for the purposes of illustration, upon a track 6. The locomotive includes a frame 7 upon which is mounted a body portion 8 at the rear of which is located a cab 9.

The cab 9 is provided with suitable windows 10 for the use of the operator, while a lightning arrester 11 is mounted therein, as clearly shown in the drawings.

The numerals 12 designate a plurality of high voltage storage batteries, while 13 indicates the master controller cut out and connection box positioned within the cab.

A suitable controller equipment for the motors is designated at 14 and is likewise positioned in the cab within the convenient reach of the operator.

The frame 7 has the customary front and rear trucks 15 and 16, while positioned therebetween in suitable supports 17 are the drive wheels 18. These drive wheels 18 are mounted upon the axles 19 which carry the armatures 20 of suitable electric motors 21 which are operatively connected with the storage batteries 12 by means of which current is supplied to the motors and the drive wheels 18 actuated in an obvious manner.

In order to provide for sufficient resiliency of the drive wheels 18, the supports 17 carry compressed coil springs 22 and also pneumatic cushioning devices 23, in order that there will be no shock carried to the motors 21 which might cause injury thereto.

The batteries 12 are kept charged by means of the generators 24 which can be cooled by means of the blowers 25 mounted thereon.

Suitable gas or oil engines shown at 26 are in operative connection with the generators 24 for actuating the latter. The same may be started by means of the electric starters 27 when it is desired to charge the batteries after the voltage therein has become lowered.

The generators 24 and engines 26 and also the motors 21 are shown in conventional form only, as their specific structure has no bearing on the present application.

An automatic coupler 28 is mounted upon the forward end of the locomotive in advance of the cow-catcher 29, while the same is provided with one or more head lights 30 provided with a large lamp of preferably 200 watts shown at 31 and a smaller lamp of about 50 watts shown at 32.

The former of these lamps is used when the locomotive is in use, while the latter is used when the same is standing on a siding or not in motion.

The current of these lamps is supplied by means of a generator 33 actuated through the medium of a belt 34 which engages a motor 35 mounted in the forward end of the body portion 8.

This motor 35 also operates a fan 36 which coöperates with a radiator 37 supplied from the water tank 38 mounted at the upper portion of the locomotive. The tank 38 has positioned adjacent thereto a plurality of corresponding tanks 39, 40 and 41. The tank 39 is designed for receiving kerosene or other fuel for the engines 26, while the tank 40 receives oil for the generators, motors and the like. The tank 41 is adapted to contain compressed air for use in operating the blowers 25.

The radiator 37 is connected to the engines 26 by means of a pipe line 42, and is supplied with water from the water tank 38 through the pipe line 43.

The fuel is supplied to the engines 26 through the pipes 44 which are controlled by means of a three-way valve 45, while oil is supplied thereto through the pipes 46 controlled by the three-way valve 47. The compressed air is supplied to the blowers by means of the pipes 48 controlled by the two-way valve 49.

The compressed air tank 41 may be supplied with air by means of a compressor 50 which is operatively connected thereto by the pipe 51 which connects the before described pipes 48.

An automatic train stopping mechanism is shown at 52 and is actuated by means of a suitable trip mechanism which may be positioned adjacent the track, but which is not shown in the drawings.

In coöperation with this stopping mechanism 52 is a bell trip device shown at 53 which is designed to simultaneously ring a bell within the cab and also in various stations along the line when the train has been stopped at any point.

As the particular mechanism for the automatic train stopping device and the bell ringing apparatus forms no part of the invention, a detailed description and showing thereof is not deemed necessary in this application.

The numeral 54 shows the grouped rheostat boxes operatively connected to the various corresponding elements of the locomotive, while the numeral 55 shows the grouped contactors which are likewise operatively connected thereto.

From the foregoing description taken in connection with the accompanying drawings, the operation of the locomotive will be obvious, the driver within the cab simply by means of the controller causing the operation of the motors 21 which drive the locomotive in the desired manner.

These motors, it will be seen, are supplied with their current from the batteries 12 which are charged with the generators 24 through the assistance of the oil engines 26. These engines are supplied with both fuel and lubricant from the tanks 39 and 40, while the head lights 30 are supplied with current from the generator 33 through the assistance of the motor 35 which also operates the fan for cooling the circulating system and the compressor 50 for operating the blowers 25 and filling the tank 41 with compressed air.

Any desired means for wiring the various electrical parts may be employed, the form shown in Fig. 2 being only one method of wiring the same.

As shown in Fig. 2, a conductor 56 leads from the batteries 12 to one pole of the motors, while a conductor 57 leads to the switch 14, the opposite contact member of which is connected by a conductor 58 to the opposite terminals of said batteries.

Obviously when the switch 13 is closed, the circuit including the motors will be closed and the latter will be set in operation, while, when the switch 14 is open, as shown in Fig. 2, the circuit is broken and the motors are inoperative.

The rheostats 54 are connected by a conductor 59 to the before described conductor 57, while a conductor 60 completes the circuit from the rheostats to the batteries 12.

The bell trip device is connected to the batteries by the conductors 61 and 62, the former of which connects with the conductor 63 which leads from the generators 24 to one terminal of the batteries 12, while the said conductor 62 leads to the bell and thence to the conductor 64 which leads from the opposite terminal of the battery to which the conductor 63 is connected through the opposite poles of the generators 24.

The circuit in which the conductor 64 is included may be broken by a suitable switch 65.

The starter 27 is connected by a conductor 66 which leads therefrom to one terminal of the batteries 12 and is controlled by a switch 67, while the opposite terminal of the starter 27 is connected by a conductor 68 to the batteries 12 through the conductor 63 to which it is attached.

The grouped contactors 55 are connected by the conductors 69 and 70 to the opposite terminals of the batteries 12, as shown.

It will therefore be readily apparent that a locomotive of the nature described is provided, which will fulfil all of the necessary requirements of such a machine, and it should be understood in this connection that various minor changes in the specific details of construction may be resorted to within the scope of the appended claims without departing from the spirit or sacrificing any of the advantages of the invention.

Having thus fully described the invention, what I claim as new and desire to protect by Letters Patent is:

1. In an electric locomotive, the combination with a body portion, of a plurality of drive wheels, axles supporting the drive wheels, motors carried by the axles, batteries for supplying current to the motors, generators for charging the batteries, engines for actuating the generators, blowers for cooling the generators, a series of tanks, and means connecting the generators and engines with the tanks for supplying fuel, lubricant, water and compressed air thereto.

2. In a locomotive such as described, the combination of an electric driving means, batteries for supplying current to the electric driving means, generators for charging said batteries, engines for operating the generators, a water tank, a radiator operatively connected to said tank, and a pipe line leading from the radiator to the engines.

3. In a locomotive of the character described, the combination of an electric driving means, batteries for supplying current thereto, generators for charging said batteries, blowers operatively connected to the generators, a compressed air tank having communication with the blowers, and a compressor for compressing air in said tank.

In witness whereof I have hereunto set my hand.

JACK A. MANNS.